Figure 2:
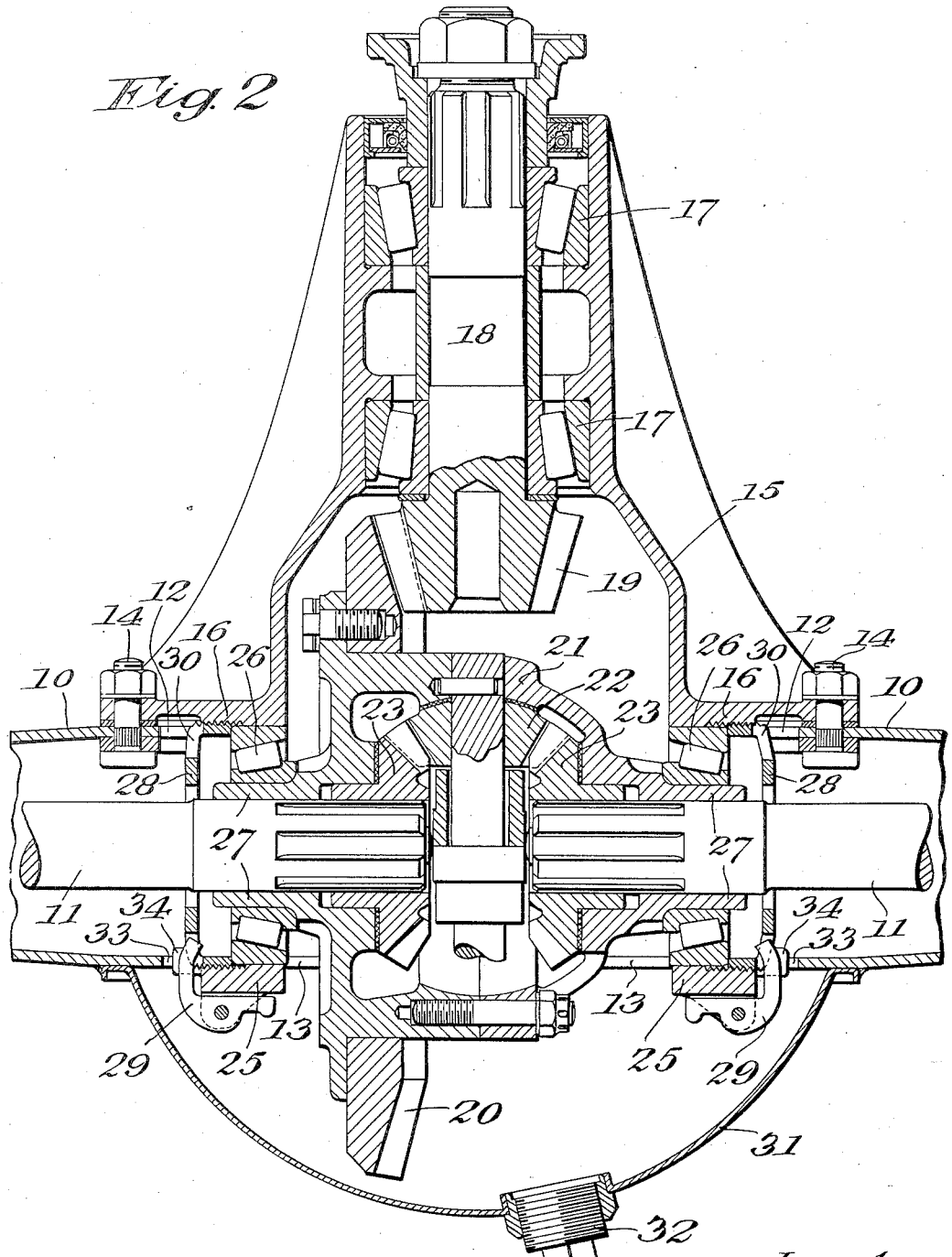

Oct. 8, 1935.　　　W. C. OBEREM　　　2,016,343
REAR AXLE ASSEMBLY
Filed March 15, 1934　　　2 Sheets-Sheet 1
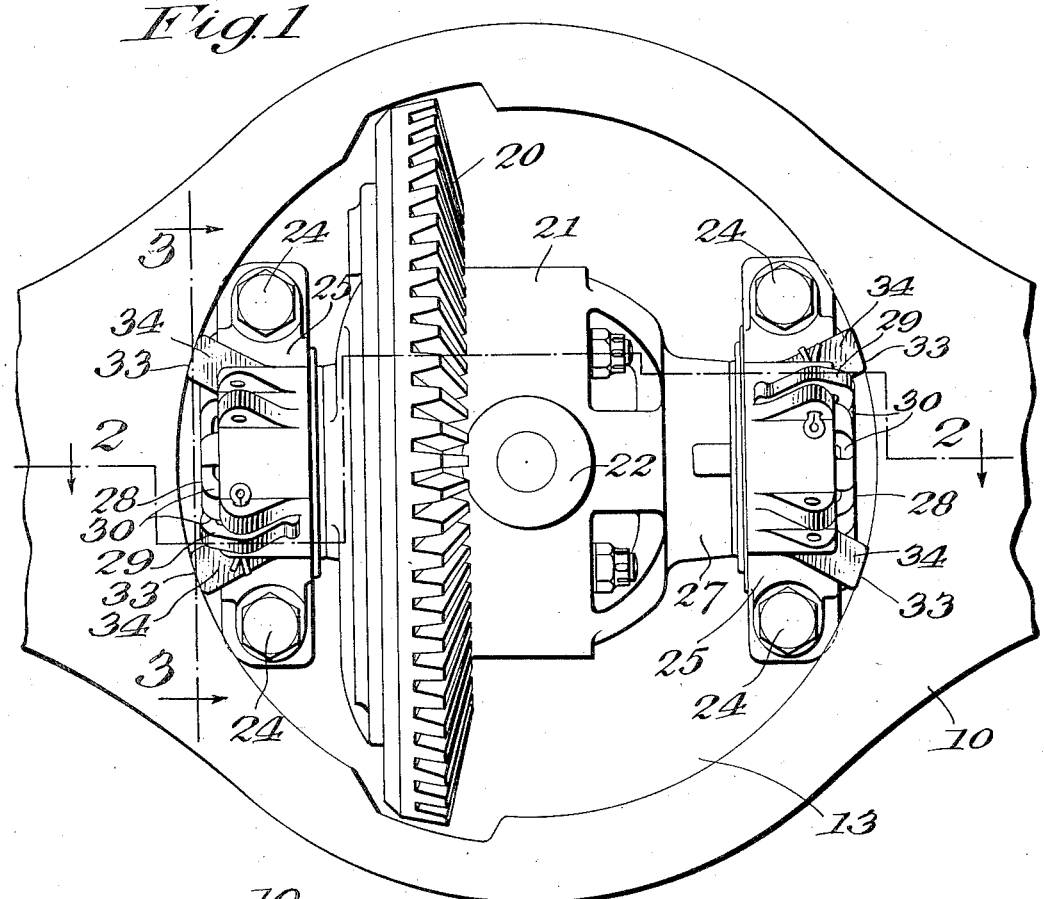
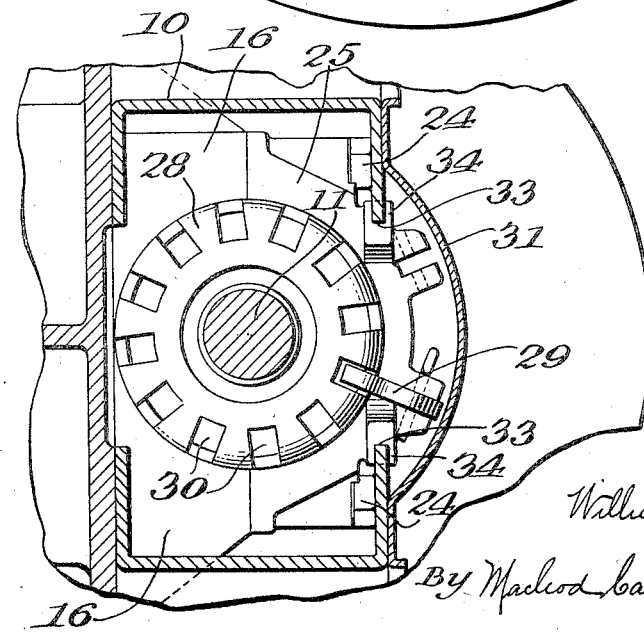

Patented Oct. 8, 1935

2,016,343

UNITED STATES PATENT OFFICE 2,016,343

REAR AXLE ASSEMBLY

William C. Oberem, Detroit, Mich., assignor to Hudson Motor Car Company, Detroit, Mich., a corporation of Michigan Application March 15, 1934, Serial No. 715,655

5 Claims. (Cl. 74—311)

This invention relates to motor vehicle rear axle assemblies of the type comprising a rear axle housing, a differential mechanism within the housing and cooperating with live axle sections, and a differential carrier seated in the housing and having spaced or separated arms carrying at their outer free ends bearings in which the differential spider is journaled. In such assemblies, particularly under heavy loads, there is a tendency for the unsupported free ends of the differential carrier arms to spread or be deflected laterally away from one another, carrying with them the differential bearings, thus resulting in misalinement of the bearings, great and uneven wear on the gear teeth of the ring gear and pinions, and the development of objectionable noise.

In the patent to Baits, No. 1,880,655, October 4, 1932, is described a construction for overcoming this difficulty by the provision of a cover for closing the usual opening in the rear of the housing through which the differential mechanism is assembled, said cover having means for engaging and rigidly embracing the outer free ends of the differential carrier arms. In the patented construction the lateral bracing of the arms depends for its effectiveness upon the rigidity of the cover, necessitating the use of a relatively heavy construction. The present invention has for an object to accomplish the same result independently of the cover, thereby relieving the latter of the load and permitting the use of a light cover which is merely heavy enough to serve as a housing for the gearing.

The foregoing and other objects of the invention will best be understood from the following description of a preferred embodiment thereof illustrated in the accompanying drawings, in which:

Fig. 1 is a rear elevation of the central portion of the axle housing with the cover removed to show the differential mechanism therein.

Figs. 2 and 3 are sections taken substantially on the lines 2—2 and 3—3, respectively, Fig. 1.

In the drawings is shown a rear axle housing 10 enclosing live axle sections 11 and having a central enlarged portion formed with oppositely disposed front and rear openings 12 and 13. Seated in the opening 12, and secured to the surrounding portion of the housing 10, as by bolts 14, is a differential carrier 15 in the form of a yoke having a pair of rearwardly extending, separated parallel arms 16. The head of the yoke 15 carries the bearings 17 for the propeller shaft 18 having fast upon its rear end the usual drive pinion 19 which meshes with a ring gear 20 carried by the differential spider 21. The latter carries the planetary pinions 22 which mesh with gears 23 on the ends of the drive axle sections 11. Secured to the outer free ends of the carrier arms 16, as by screws 24, are bearing caps 25 which cooperate with the body portions of the arms to support the bearings 26 for oppositely disposed arms or trunnions 27 with which the differential spider 21 is provided and in which the inner ends of the live axle sections 11 are axially disposed. The bearings 26 are adjustably held in place in the arms 16 by retainers 28 in threaded engagement with the openings formed by said arms and the caps 25, the latter having pivoted thereto keys or latches 29 engaging slots 30 in the retainers 28. The parts of the differential mechanism are assembled in the axle housing through the rear opening 13 therein, which opening is thereafter closed by a cover 31 having the usual filler plug 32.

In accordance with the present invention, means are provided for laterally bracing the outer free ends of the differential carrier arms directly from the edge of the opening 13 in the axle housing in such a manner as rigidly and effectively to hold them against spreading, while permitting the use of a cover 31 of light construction sufficient only to enable it to perform the function of housing the parts, retaining lubricant, and excluding dirt. In the construction shown, the opening 13, which is substantially circular, is finish bored to form, at least at the sides, accurate bearing surfaces 33, while the bearing caps 25, which are located immediately adjacent the edge of said opening, are provided with lugs 34 which project laterally therefrom in opposite directions respectively and have finish turned ends which fit and directly engage the finish bored surface on the edge of the opening. As shown, each cap 25 is provided with two lugs 34 arranged in outwardly diverging relationship and each disposed substantially radial of the portion 33 of the edge of the opening 13 which it engages. The lugs 34 are thus accurately piloted in the opening 13 and react laterally against the free ends of the separated carrier arms in such a manner as to hold the latter rigidly against spreading, thereby effectively maintaining the proper alinement of the differential bearings.

While the invention has been herein shown and described in connection with a particular form or axle housing and differential assembly, it will be obvious to those skilled in the art that embodiments of said invention, as defined in the following claims, may assume a considerable variety of forms in accordance with the requirements of rear axle design without departure from its spirit and scope.

I claim:

1. A rear axle assembly for motor vehicles comprising an axle housing having an opening therein, a differential carrier seated in said housing and having a pair of separated arms the outer free ends of which are located adjacent said opening, a differential spider journalled in said arms, and means interposed between the outer free ends of said arms and the edge of said opening and reacting laterally against said ends for rigidly holding the latter against spreading, said means comprising lugs on one of said parts and directly engaging the other.

2. A rear axle assembly for motor vehicles comprising an axle housing having an opening therein, a differential carrier seated in said housing and having a pair of separated arms the outer free ends of which are located adjacent said opening, alined bearings carried by said arms, and lugs on said free ends projecting laterally in opposite directions respectively and directly engaging the edge of said opening.

3. A rear axle assembly for motor vehicles comprising an axle housing having a circular opening therein, a differential carrier seated in said housing and having a pair of separated arms the outer free ends of which are located adjacent said opening, alined bearings carried by said arms, and a pair of diverging lugs disposed substantially radially of the edge of said opening projecting laterally from each of said free ends and directly engaging said edge.

4. A rear axle assembly for motor vehicles comprising an axle housing having a finish bored opening therein, a differential carrier seated in said housing and having a pair of separated arms the outer free ends of which are located adjacent said opening, alined bearings carried by said arms, and lugs on said free ends projecting laterally in opposite directions respectively and having finish turned ends fitting and directly engaging the edge of said opening.

5. A rear axle assembly for motor vehicles comprising an axle housing having an opening therein, a differential carrier seated in said housing and having a pair of separated arms with free outer ends, bearing caps secured to the ends of said arms and located adjacent said opening, and lugs on said caps projecting laterally in opposite directions respectively and directly engaging the edge of said opening.

WILLIAM C. OBEREM.